United States Patent Office 3,419,618
Patented Dec. 31, 1968

3,419,618
PROCESS FOR PREPARING ACETALDEHYDE
Lothar Hirsch, Kelkheim, Taunus, and Lothar Hörnig, Günther Mau, and Therese Quadflieg, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 30, 1965, Ser. No. 444,055
Claims priority, application Germany, Apr. 16, 1964,
F 42,629
5 Claims. (Cl. 260—604)

ABSTRACT OF THE DISCLOSURE

A process has been provided for preparing acetaldehyde from ethylene and oxygen, in presence of a catalyst, which comprises reacting a gaseous mixture containing ethylene and elementary oxygen in the presence of palladium (II) oxide as catalyst.

---

The present invention relates to a process for preparing acetaldehyde.

It is known to transform ethylene continuously into acetaldehyde by oxidizing it with oxygen in the presence of water, a noble metal salt, in particular palladium chloride, and a salt of a metal that may be present in several valences, in particular copper chloride. This known process is carried out industrially, either in one or in two stages. When it is carried out in one stage ethylene and pure oxygen react together with the catalyst solution containing $PdCl_2$ and $CuCl_2$. When it is carried out in two stages ethylene is reacted with the catalyst solution in a first reactor and oxygen or air is reacted with the catalyst solution in a second reactor. In both cases chlorine-containing by-products, for example, chloroacetaldehyde and methyl chloride, form, which is due to the known effect of copper (II) chloride on acetaldehyde.

The present invention is based on the observation that acetaldehyde can be prepared from ethylene and oxygen by passing a gaseous mixture containing ethylene and elementary oxygen, advantageously in the presence of water, over a catalyst containing palladium (II) oxide.

Palladium (II) oxide serves as the catalyst. It may be used alone but advantageously it is applied before its use to a carrier that is inert towards the reaction. Particularly suitable carrier materials are those having large surfaces, for example, aluminum oxide, aluminum silicate, silica gel, asbestos, zeolites, feldspars, pumice, clays, molecular sieves and other silicate-containing carriers.

The system comprising the catalyst and its carrier can be prepared in various ways. The carrier may, for example, be impregnated with the solution of a palladium salt, advantageously palladium (II) nitrate, and the palladium oxide contained in the palladium salt may then be set free by slowly heating the impregnated carrier in the presence of air to a temperature within the range of from 500° to 1000° C. The system formed of catalyst and carrier can also be prepared by impregnating the carrier with the solution of a palladium salt, preferably palladium (II) chloride, reducing the palladium chloride to elementary palladium by treating it with hydrogen at a temperature within the range of 80° to 200° C., washing it with water until it is free from chloride ions and then converting the elementary palladium in a current of oxygen at a temperature within the range of 750° to 820° C. into palladium (II) oxide. The latter method of preparing the catalyst is a little more complicated than the first-mentioned method but in general it enables the palladium (II) oxide to be applied to the carrier in a fine and more uniform distribution.

The system comprising the catalyst and its carrier can also be prepared by impregnating the carrier with the solution of a palladium salt, for example, the chloride, converting the salt with an alkaline substance, for example, potassium hydroxide solution, into the hydrated oxide and converting the hydrated oxide at a temperature within the range of 500° to 1000° C. into the oxide.

The presence of palladium (II) oxide (PdO) on the carrier can be detected before, during and after the reaction in a simple manner by treating the carrier with nitric acid and hydrochloric acid. Nitric acid is known to dissolve elementary palladium and hydrochloric acid is known to dissolve palladium salts. The two acids do not attack palladium (II) oxide.

The activity of the catalyst depends on the manner in which the catalyst has been prepared and on the concentration of the palladium (II) oxide on the carrier. It is advantageous to use catalysts containing 1 to 40% by weight, preferably 2 to 20% by weight, calculated on the total weight of the system comprising palladium oxide and carrier, of palladium oxide. But acetaldehyde can still be obtained when the concentration of palladium (II) oxide is less than 1 or more than 40% by weight. However, concentrations of more than 20% of palladium (II) oxide are not always advantageous since then it is easily possible that the palladium (II) oxide is present in a coarser and less active distribution.

In the reaction according to the invention the starting substances, ethylene and oxygen, are in general conducted together over the catalyst.

The ratio of ethylene and oxygen may vary within wide limits. When the process is carried out on an industrial scale the said ratio is limited by the explosion limits of mixtures of ethylene and oxygen. Consequently it is not indicated in general to use gas mixtures which contain ethylene and oxygen in the (stoichiometrical) molar ratio of 2:1. On the contrary, it is advantageous to use ethylene in a quantity that is equal to twice the molar quantity of oxygen. But it is also possible to use an excess of oxygen. In this case the reaction takes place in a purely gaseous phase.

The gaseous starting materials may also be used in admixture with other gases that are inert towards the reaction, for example, hydrocarbons of low molecular weight such as ethane, nitrogen, noble gases and carbon dioxide. In particular, the oxygen required for the oxidation may be used in the form of air.

It is advantageous to carry out the reaction in the presence of water. The water may be used in the form of vapour. In this case it is advantageous to conduct a gaseous mixture consisting of ethylene, oxygen, water vapour and, if desired, an inert gas over the catalyst. The water may also be used in the liquid state. The mixture of ethylene and oxygen, which may also contain an inert gas may then, for example, be conducted over the fixed catalyst in the same direction as the water or in countercurrent to the water. In these cases the reaction takes place in mixed phases. It is also possible first to place the water which may contain a solvent which is inert towards the reaction and which advantageously is miscible with the water, into the reaction vessel, then to suspend the catalyst in free form or when applied to a carrier in the aqueous liquid and to introduce the mixture of ethylene and oxygen into the resulting suspension. In this case the reaction according to the invention takes place in the liquid phase.

When the reaction is not carried out in the liquid phase it is often advantageous to conduct the gaseous starting compounds through a reaction tube containing the catalyst or through a bundle of tubes. When liquid water is used it is advantageous to use a trickling tower filled with the catalyst. The fresh gases and the water may then be conducted in parallel currents or in countercurrent to one another. When a catalyst is used that has been suspended in a liquid the reaction vessel may be designed, for example, as a rotary reactor (mammoth pump).

It is possible to add to the catalyst or, if the reaction is carried out in liquid water, to the water reaction accelerators. As examples of such substances there may be mentioned salts, the aqueous solutions of which have a pH value that is not too far from the neutral point and is within the range of about 5 to 10, for example, solutions of trisodium phosphate, alkali carbonates or other salts. The reaction may also be accelerated by adding to the catalyst or the aqueous solution containing the catalyst compounds of metals of sub-group II of the Periodic Table, that is to say compounds of zinc, cadmium or mercury.

The temperatures and pressures to be maintained are not critical in the process according to the invention. In order to obtain a higher degree of conversion it is suitable to use higher temperatures and pressures. However, the application of temperatures and pressures that are too high favours the formation of undesired by-products, in particular the formation of oxidation products. It is therefore suitable in practice to use a temperature within the range of 20° to 350° C., preferably 50° to 250° C., and a pressure within the range of 0.2 to 20, preferably 1 to 10 atmospheres. However, as has been mentioned already, the reaction according to the invention also takes place at temperatures and pressures outside the said ranges.

In general the conversion is not complete and a mixture of acetaldehyde, ethylene and possibly water, oxygen and inert gases is obtained. In general the reaction mixture also contains small amounts of ethylene glycol, acetic acid, which has probably been formed from acetaldehyde and oxygen, and carbon dioxide. If it is desired to prevent the formation of acetic acid to a large extent it is suitable either to allow the degree of conversion of ethylene and oxygen to be low and to return the unreacted gaseous substances to the reaction zone or to limit the introduction of oxygen, so that the conversion of the oxygen is practically complete.

The acetaldehyde that has formed is advantageously separated from the reaction mixture by condensation and/ or by washing the reaction gases with a suitable solvent, for example, water. When the reaction according to the invention is carried out already in the presence of water or water vapour a washing with fresh water may be dispensed with. The working up is advantageously brought about by subjecting the condensation product or the charged washing liquid to a distillation. When water is used as the washing liquid and/or when water is present during the reaction already the water can be returned to the reaction zone and/or to the washing zone after the acetaldehyde has been separated by distillation from the condensation product or the charged washing liquid. When the mixture to be worked up does not contain any water the acetaldehyde is advantageously separated by condensation.

When the gas and/or liquid is or are conducted in a cycle it is indicated to draw off and reject a part of the currents that are recycled in order to avoid an accumulation of by-products.

In contradistinction to the known industrial process for preparing acetaldehyde in two stages, in the process according to the present invention ethylene and oxygen are simultaneously brought into contact with the catalyst. Another difference between the known process and the process according to the invention is that in the latter process the palladium (II) oxide which is used as the catalyst is not reduced during the reaction. Consequently no metallic palladium precipitates, so that it is not necessary to operate in the presence of a redox system such as $CuCl_2$. The process according to the invention also offers the advantage that due to the absence of metal chlorides no chlorinated by-products can form. Moreover, since no corroding reactants are present or form, no expensive materials such as titanium are required for the construction of the apparatus to be used for carrying out the process of the invention.

The following examples serve to illustrate the invention but they are not intended to limit it thereto.

Example 1

450 cc. of aluminum silicate ("bentonite") in the form of balls having a diameter of 4 to 5 mm. were evaporated to dryness together with a solution of 55 g. of palladium (II) chloride (which corresponded to 33 g. of Pd) in aqueous hydrochloric acid. The carrier which had thus been impregnated was treated at 100° C. in a current of hydrogen. During this treatment the palladium chloride was reduced to the metal. After having been washed with water and dried the catalyst was treated with oxygen in a steel tube at 800° C. under atmospheric pressure. During this operation the palladium was converted into palladium (II) oxide.

The catalyst was then introduced into a vertically arranged heatable tube having a diameter of 23 mm. and a height of 1,000 mm. 80 cc. per hour of an aqueous solution of 5% strength by weight of trisodium orthophosphate were introduced into the upper end of the reactor. A gaseous mixture of 1 mole of ethylene and 0.4 mole of oxygen was conducted per hour over the catalyst in the same direction as the water. The pressure was 1 atmosphere and the internal temperature of the reactor was 90° C. The mixture of gas and liquid leaving the catalyst was cooled to 20° C. and separated. The off-gas and the condensation product each contained 0.08 to 0.1 mole per hour of acetaldehyde.

Example 2

300 g. of aluminum oxide in the form of balls having a diameter of 7 mm. were evaporated in a rotary evaporator together with an aqueous solution of 30 g. of palladium (II) nitrate (which corresponded to 12 g. of Pd). The mixture was heated for about 2 hours to a temperature within the range of 500° to 600° C. in a porcelain tube while introducing a small amount of air. During this treatment the palladium salt was converted into the oxide while nitrous gases and water were given off.

The catalyst was introduced into an obliquely arranged tube of refined steel having a diameter of 25 mm. and a length of 500 mm. and it was charged at 170° C. under a pressure of 5 atmospheres (gauge) with 210 litres (measured at N.T.P.) of a gaseous mixture comprising 62% by volume of ethylene, 6% by volume of oxygen, 16% by volume of water vapour, 8% by volume of ethane and 8% by volume of nitrogen. The gaseous mixture leaving the reactor was expanded and cooled whereupon 25 g. of a condensation product containing 5.1 g. of acetaldehyde were obtained per hour. The residual gas was washed with water. The wash water that was thus obtained contained another 6.4 g. of acetaldehyde.

Example 3

400 cc. of silica gel having a medium grain size of 5.5 mm. were impregnated with 30 g. of palladium (II) chloride in the manner described in Example 1 and, likewise in the manner described in Example 1, the mixture was treated with hydrogen, washed, and converted into the finished catalyst by a treatment with oxygen at 800° C.

The catalyst was then stirred with a solution of 5 g. of cadmium sulfate ($3CdSO_4 \cdot 8H_2O$) in 100 cc. of water and introduced into a tube having a diameter of 50 mm. and a length of 300 mm. 40 litres (at N.T.P.) of ethylene and 10 litres (at N.T.P.) of oxygen which had previously been passed at 20° C. through a washing bottle containing water were introduced per hour at the lower end of the reactor. At the head of the reactor a reflux condenser was arranged. The reaction was carried out under a pressure of 1 atmosphere and at a temperature of 80° C. The gas leaving the reactor contained 76.5% by volume of ethylene, 16.7% by volume of oxygen, 5.6% by volume of acetaldehyde and 1.2% by volume of carbon dioxide. This corresponded to a degree of conversion of 7.5%, calculated on the ethylene used, and of 19.5%, calculated on the oxygen used, and to a yield of 90%, calculated on the ethylene used, and of 70%, calculated on the oxygen used.

What we claim is:

1. A process for preparing acetaldehyde from ethylene and oxygen which comprises reacting a gaseous mixture containing ethylene and elementary oxygen in the presence of a catalyst consisting essentially of palladium (II) oxide as the active component.

2. A process as claimed in claim 1, wherein the reaction is carried out in the presence of water.

3. A process as claimed in claim 1, wherein the palladium (II) oxide is applied to a carrier.

4. A process as claimed in claim 1, wherein the reaction is carried out at a temperature within the range of 20° to 350° C.

5. A process as claimed in claim 1, wherein the reaction is carried out under a pressure within the range of 0.2 to 50 atmospheres.

References Cited

UNITED STATES PATENTS

| | | | |
|---|---|---|---|
| 3,300,528 | 1/1967 | Wakasa et al. | 260—604 X |
| 3,131,223 | 4/1964 | Smidt et al. | 260—604 X |

LEON ZITVER, *Primary Examiner.*

R. H. LILES, *Assistant Examiner.*